(12) United States Patent
Chiba

(10) Patent No.: US 8,134,105 B2
(45) Date of Patent: Mar. 13, 2012

(54) LIGHT QUANTITY MEASURING DEVICE AND METHOD FOR MEASURING LIGHT QUANTITY THAT SELECTIVELY CONNECTS LIGHT RECEPTION ELEMENTS BASED ON INCIDENT LIGHT ANGLE

(75) Inventor: Tadashi Chiba, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 299 days.

(21) Appl. No.: 12/372,767

(22) Filed: Feb. 18, 2009

(65) Prior Publication Data

US 2009/0230313 A1 Sep. 17, 2009

(30) Foreign Application Priority Data

Mar. 17, 2008 (JP) .................................. 2008-068192

(51) Int. Cl.
*G01C 21/02* (2006.01)
*G01J 1/44* (2006.01)

(52) U.S. Cl. ................... 250/203.4; 250/206; 250/206.2

(58) Field of Classification Search ............... 250/203.4, 250/206, 206.1, 206.2; 136/244, 246
See application file for complete search history.

(56) References Cited

U.S. PATENT DOCUMENTS
4,510,385 A * 4/1985 Welman ..................... 250/203.4

FOREIGN PATENT DOCUMENTS
JP 2000-121430 4/2000
* cited by examiner

*Primary Examiner* — Thanh X Luu
(74) *Attorney, Agent, or Firm* — Volentine & Whitt, PLLC (57) ABSTRACT

A light quantity measuring device includes a first light reception element, a second light, reception element, an identification circuit, and a selection circuit. The first light reception element receives a predetermined incident light at a first light reception surface. The second light reception element receives the incident light at a second light reception surface, which is oriented in the same direction as the first light reception surface. The identification circuit identifies an incident angle of the incident light with respect to the first light reception surface. The selection circuit, when the incident angle differs from a desired incident angle, selectively electrically connects an output portion of the second light reception element to an output portion of the first light reception element.

1 Claim, 7 Drawing Sheets

LIGHT QUANTITY MEASURING DEVICE AND METHOD FOR MEASURING LIGHT QUANTITY THAT SELECTIVELY CONNECTS LIGHT RECEPTION ELEMENTS BASED ON INCIDENT LIGHT ANGLE

CROSS-REFERENCE TO RELATED APPLICATION

This application claims priority under 35 USC 119 from Japanese Patent Application No. 2008-068192, the disclosure of which is incorporated by reference herein.

BACKGROUND OF THE INVENTION

1. Field of the Invention

The present invention relates to a light quantity measuring device and a method for measuring light quantity that measure a incident light quantity.

2. Description of the Related Art

In recent years, light quantity measuring devices that measure light quantities, of ultraviolet radiation and the like included in sunlight and the like, have become widespread.

Figure 7:
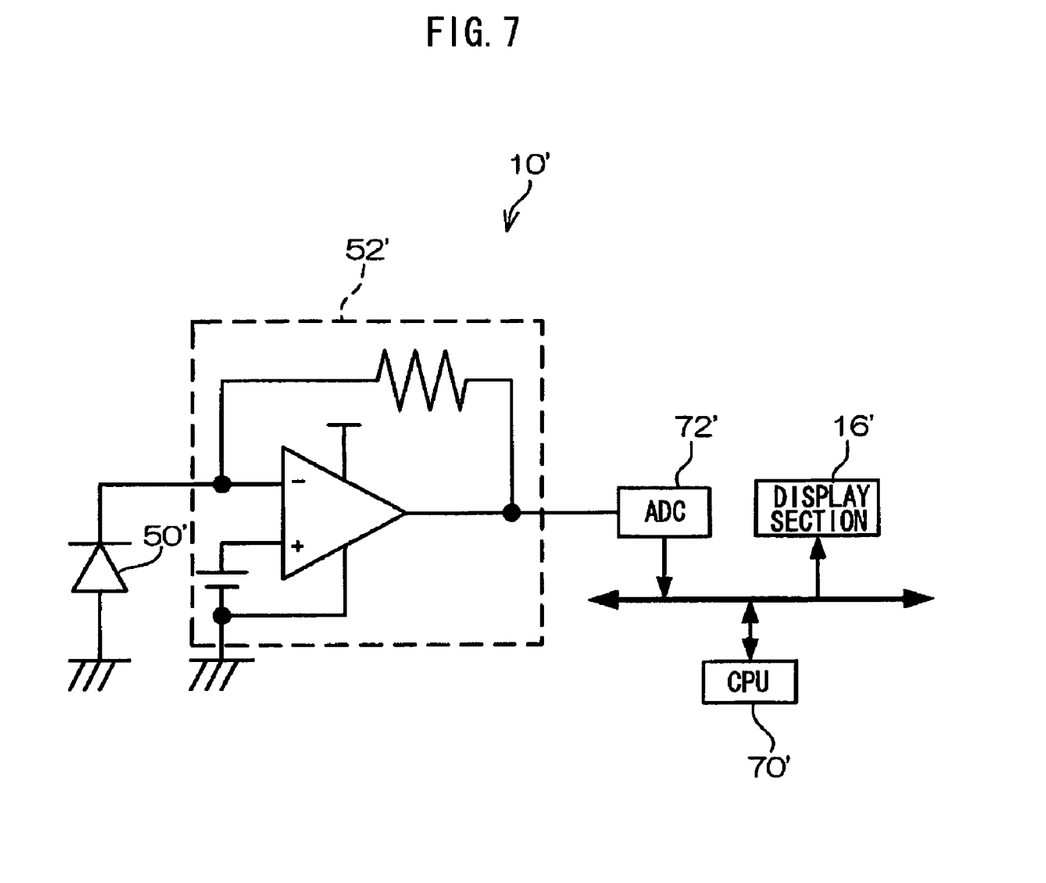
FIG. 7 is a block view (a partial circuit diagram) showing structure of a conventional light quantity measuring device.

FIG. 7 shows an example of an electrical structure of a conventional light quantity measuring device 10'.

The light quantity measuring device 10' includes a light reception element 50' that outputs a signal representing a quantity of light incident on a light reception surface. The signal outputted by the light reception element 50' is converted to a voltage by a converter 52', the voltage converted by the converter 52' is converted to a digital signal by an analog/digital conversion circuit (hereinafter referred to as an ADC) 72', the incident light quantity on a light reception surface 60 is calculated from the digital signal by a CPU 70', and information representing the calculated light quantity is displayed at a display section 16'.

However, as a position of the sun changes with time, an incident angle of incident light with respect to a light reception portion 12' shifts from a direction at which the quantity of incident light is at a maximum (for example, a direction in which the light is incident at 90° with respect to the reception surface). As a result, with such a device, received light quantities according to the light reception element are decreased relative to actual light quantities, by quantities corresponding to the shifting.

Japanese Patent Application Laid Open (JP-A) No. 2000-121430 has disclosed a technology which is: a retainer including a support pedestal that retains the light quantity measuring device; a fixed platform that axially supports the support pedestal to be rotatable; and a base to which the fixed platform is fixed. By the support pedestal that retains the light quantity measuring device being turned, the light reception surface of the light quantity measuring device is oriented to 90° with respect to the sun.

However, it is necessary for an operator him/herself to adjust the incident angle of incident light on the light reception surface of the light quantity measuring device.

SUMMARY OF THE INVENTION

The present invention has been made in view of the above circumstances and provides a light quantity measuring device and a method for measuring light quantity.

A first aspect of the present invention provides a light quantity measuring device includes a first light reception element, a second light, reception element, an identification circuit, and a selection circuit. The first light reception element receives a predetermined incident light at a first light reception surface. The second light reception element receives the incident light at a second light reception surface, which is oriented in the same direction as the first light reception surface. The identification circuit identifies an incident angle of the incident light with respect to the first light reception surface. The selection circuit, when the incident angle differs from a desired incident angle, selectively electrically connects an output portion of the second light reception element to an output portion of the first light reception element.

A second aspect of the present invention provides a method for measuring light quantity. The method includes, in a light quantity measuring device including a first light reception element that receives a predetermined incident light at a first light reception surface and a second light reception element that receives the incident light at a second light reception surface, which is oriented in the same direction as the first light reception surface, identifying an incident angle of the incident light with respect to the first light reception surface, and when the incident angle differs from a desired incident angle, selectively electrically connecting an output portion of the second light reception element to an output portion of the first light reception element.

DETAILED DESCRIPTION OF THE INVENTION

Herebelow, an exemplary embodiment of the present invention will be described in detail with reference to the drawings. For the present exemplary embodiment, a case in which the invention is applied to a light quantity measuring device that measures quantities of light in the ultraviolet range included in sunlight will be described.

Firstly, external structure of a light quantity measuring device 10 relating to the present exemplary embodiment will be described with reference to FIG. 1A and FIG. 1B.

Figure 1A:
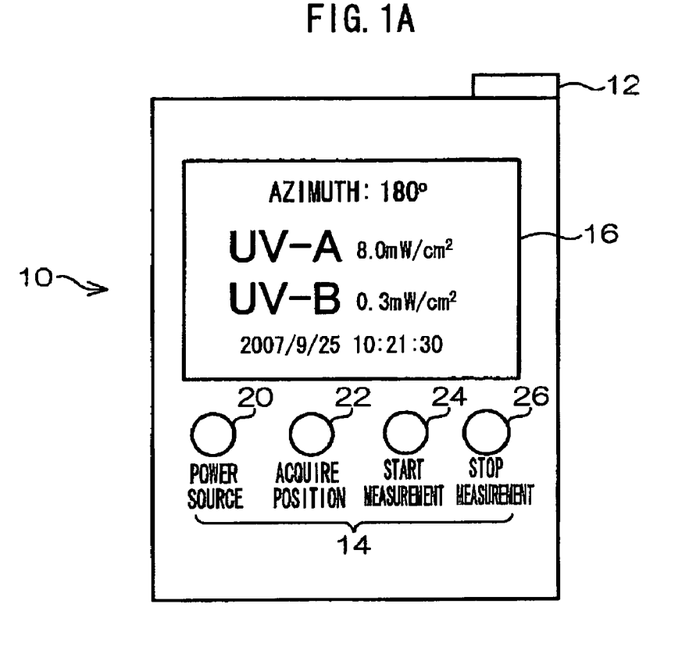
FIG. 1A is an external view showing an example of an exterior of a light quantity measuring device relating to an exemplary embodiment.

As shown in FIG. 1A, the light quantity measuring device 10 includes a light reception portion 12, a control portion 14 and a display section 16.

The light reception portion 12 includes a light reception element 50M, which will be described later, and auxiliary light reception elements 50A to 50C (also see FIG. 3). The light reception portion 12 detects light from the sun.

In the light quantity measuring device 10 relating to the present exemplary embodiment, the number of auxiliary light reception elements that are employed is three. However, this is not intended to be a limitation; the number of auxiliary light reception elements may be one, and may be two, or four or more.

Figure 2:
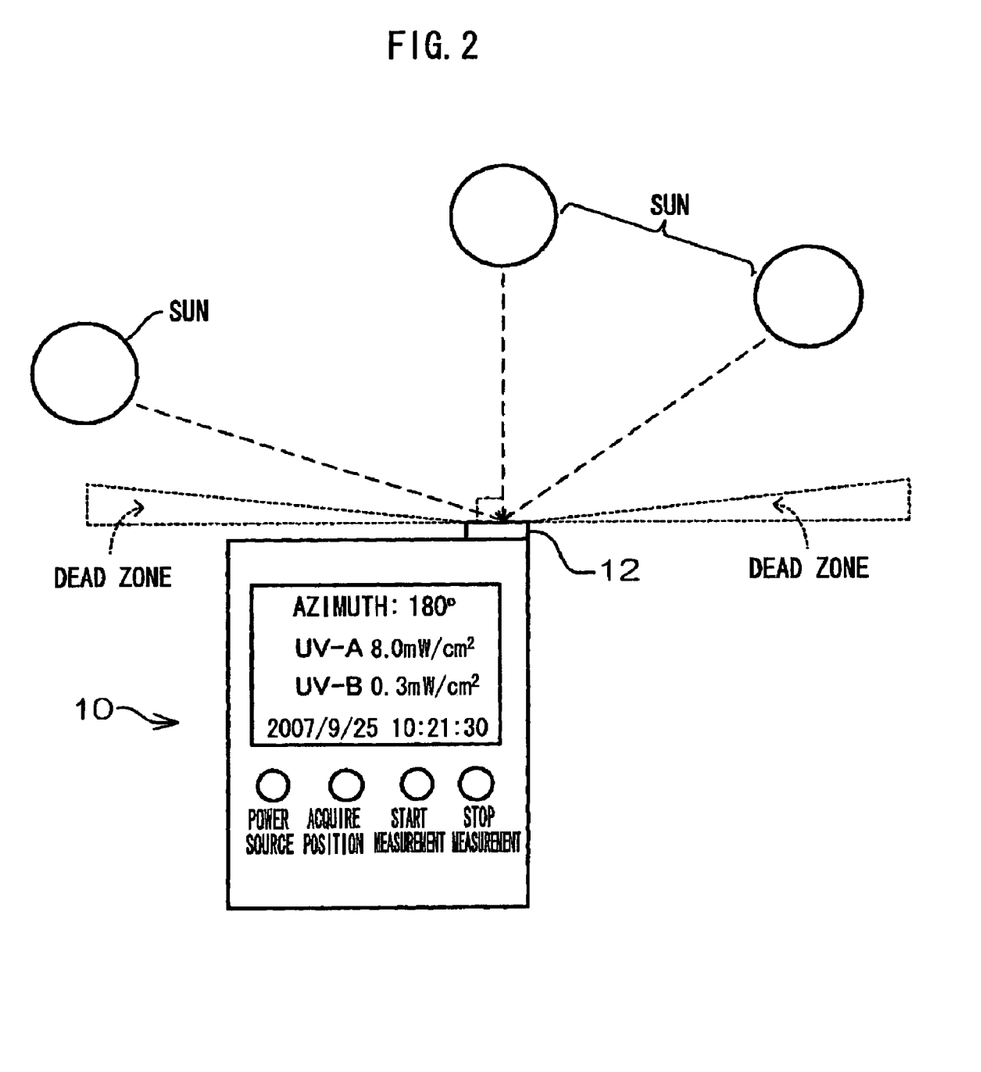
FIG. 2 is a view supporting an explanation of a dead zone of the light quantity measuring device relating to the exemplary embodiment.

In the light quantity measuring device 10, as in the example shown in FIG. 2, in accordance with a light entry range of a device casing of the light reception portion 12 and positional relationships of light reception surfaces of the light reception element 50M and the auxiliary light reception elements 50A to 50C, there is a range at which incident light cannot be detected by the light reception element 50M and the auxiliary light reception elements 50A to 50C (which is hereinafter referred to as the dead zone).

The control portion 14 includes a power switch 20, a position information acquisition switch 22, a start measurement switch 24 and a stop measurement switch 26.

When the position information acquisition switch 22 is operated by pressing, the light quantity measuring device 10 acquires information relating to position, such as information representing the latitude and longitude of a current position of the device body (hereinafter referred to as position information), information representing an azimuth to which the light reception portion 12 is oriented (hereinafter referred to as azimuth information) and the like. When the start measurement switch 24 is operated by pressing, the light quantity measuring device 10 commences measurement of light in the ultraviolet range, and when the stop measurement switch 26 is pressed, this measurement is stopped.

The display section 16 displays information of various values, such as a quantity of ultraviolet radiation in the UV-A range and a quantity of ultraviolet radiation in the UV-B range that are acquired by measurement, the current date and time, the azimuth to which the light reception portion 12 is oriented, and so forth. When an unillustrated switch is operated, the display section 16 displays various kinds of graphical information such as graphs showing variations over time of the ultraviolet radiation quantities acquired by measurement, or the like. For the light quantity measuring device 10 relating to the present exemplary embodiment, a case is described in which azimuth angles that are applied as the azimuth displayed at the display section 16 are 0° for North, 90° for East, 180° for South and 270° for West. Obviously this is not intended to be a limitation.

Figure 1B:
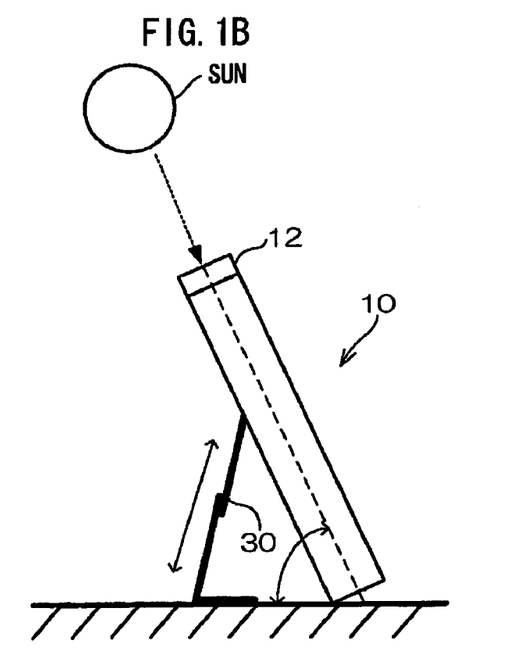
FIG. 1B is an external view showing an example of a setting of the light quantity measuring device relating to the exemplary embodiment.

The light quantity measuring device 10 relating to the present exemplary embodiment also includes a support member 30 at a rear face thereof, which positions the device body at a predetermined angle, as in the example shown in FIG. 1B.

The support member 30 relating to the present exemplary embodiment is structured with the length thereof being adjustable. Thus, the light quantity measuring device 10 is formed such that, by the length of the support member 30 being adjusted, an angle with respect to the ground, and thus the orientation of the light reception portion 12 with respect to the sun at that point in time, may be adjusted.

Next, principal configurations of an electrical system of the light quantity measuring device 10 relating to the present exemplary embodiment are described with reference to FIG. 3.

Figure 3:
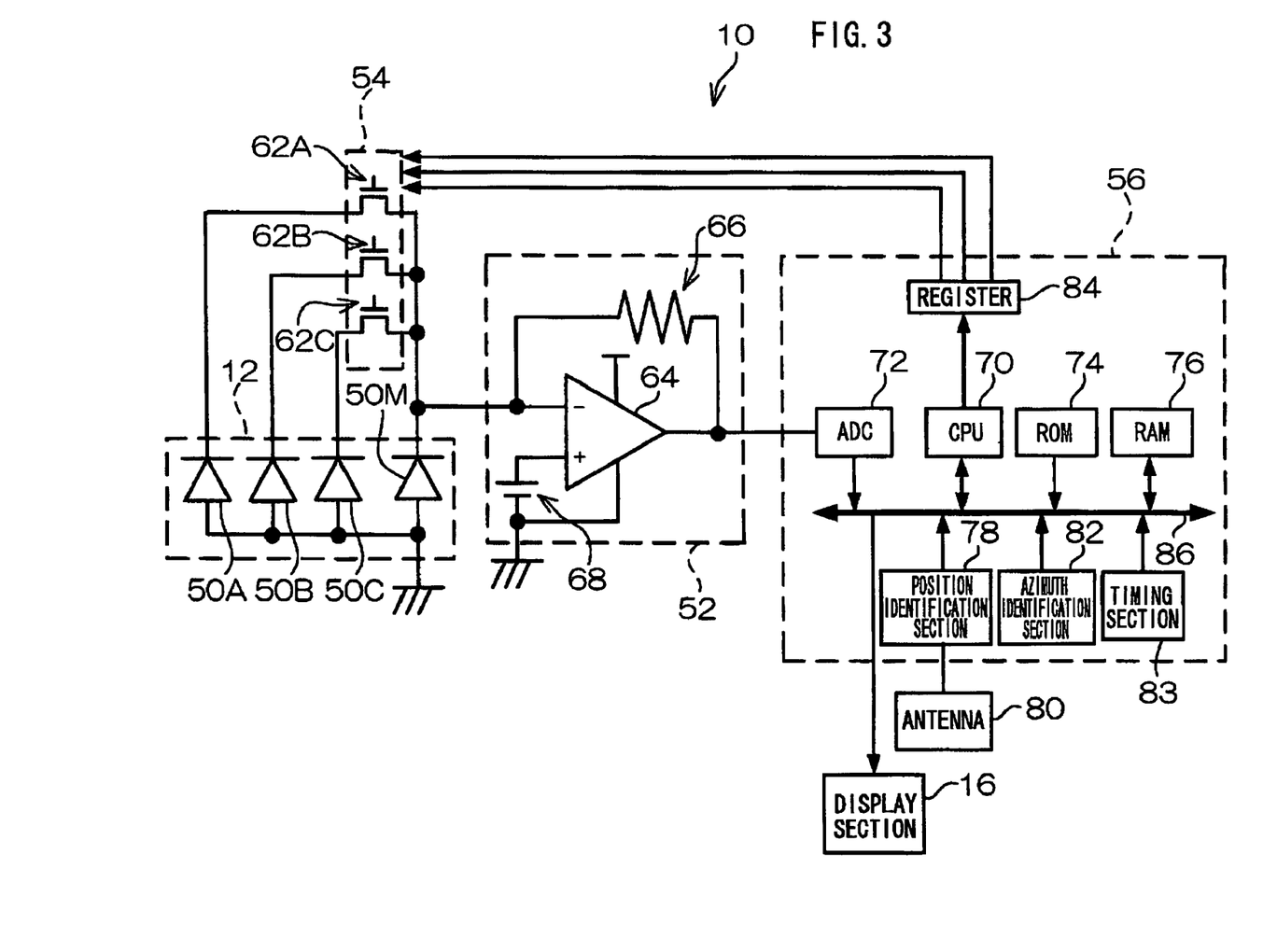
FIG. 3 is a block view (a partial circuit diagram) showing principle configurations of an electrical system of the light quantity measuring device relating to the exemplary embodiment.

As is shown in FIG. 3, the light quantity measuring device 10 includes the aforementioned light reception portion 12, a converter 52, a selection circuit 54 and a calculation section 56.

The light reception portion 12 includes the light reception element 50M and the auxiliary light reception elements 50A to 50C as mentioned above, and the light reception surfaces of the light reception element 50M and the auxiliary light reception elements 50A to 50C are oriented in the same direction.

The converter 52 relating to the present exemplary embodiment is structured to include an operational amplifier (op amp) 64, a resistance 66 and a voltage generation section 68. The inverting input terminal and the output terminal of the op amp 64 are connected via the resistance 66. The non-inverting input terminal of the op amp 64 is connected to ground via the voltage generation section 68. That is, the converter 52 relating to the present exemplary embodiment is structured to serve as a current and voltage conversion circuit that uses an inverting amplifier.

The selection circuit 54 relating to the present exemplary embodiment includes three FETs (Field Effect Transistors) 62A to 62C corresponding with the auxiliary light reception elements 50A to 50C, respectively, for selectively electrically connecting cathodes of the auxiliary light reception elements 50A to 50C to a cathode of the light reception element 50M. Thus, the selection circuit 54 relating to the present exemplary embodiment employs FETs as switching elements of the present invention. This is not intended to be a limitation. Obviously, other switching elements capable of electrical connection/disconnection may be employed, such as bipolar transistors, relay switches or the like.

In the descriptions hereafter, where it is necessary to distinguish between the respective FETs, the letter is appended after the reference numeral, and where it is not necessary to distinguish, the notation is given with the letter omitted.

The calculation section 56 relating to the present exemplary embodiment includes a CPU (Central Processing Unit) 70, an ADC 72, a ROM (Read-Only Memory) 74, a RAM (Random Access Memory) 76, a position identification section 78, an azimuth identification section 82, a timing section 83 and a register 84. The CPU 70 administers overall operations of the light quantity measuring device 10. The ADC 72 converts inputted voltages to digital signals. Various control programs, tables of information and the like are stored in the ROM 74 in advance. The RAM 76 is used for a work area during execution of various programs by the CPU 70, and stores various kinds of information and the like. The position identification section 78 identifies the latitude and longitude of a current position of the device body. The azimuth identification section 82 identifies an azimuth to which the light reception surface of the light reception element 50M provided at the light reception portion 12 is oriented. The timing section 83 implements timekeeping of a current date and time. The register 84 stores states of switching element control signals, which are sent from the CPU 70, in order to turn on the FETs 62.

In the light quantity measuring device 10 relating to the present exemplary embodiment, an apparatus that receives GPS (Global Positioning System) signals from a GPS satellite, via an antenna 80, and identifies the latitude and longitude of the current position is employed as the position identification section 78. However, this is not limiting; an apparatus that utilizes electromagnetic waves, outputted from a portable telephone or the like to a base station, or the like may be employed. Moreover, in the light quantity measuring device 10 relating to the present exemplary embodiment, an electronic compass that detects the Earth's magnetism and identifies an azimuth on the basis of the detected magnetism is employed as the azimuth identification section 82. However, this is not limiting; an apparatus that calculates an azimuth at which the sun is located from the current time, an azimuth magnet or the like may be employed.

The CPU 70, ADC 72, ROM 74, RAM 76, position identification section 78, azimuth identification section 82, timing section 83 and display section 16 are electrically connected to one another through a system bus 86. Thus, the CPU 70 may implement all of: exchanges of various kinds of information with the ROM 74 and RAM 76; reception of various kinds of information from the ADC 72, the position identification section 78, the azimuth identification section 82 and the timing section 83; and control of operations of the display section 16.

Anodes of the light reception element 50M and auxiliary light reception elements 50A to 50C of the light reception portion 12 relating to the present exemplary embodiment are connected to ground. The cathode of the auxiliary light reception element 50A is connected to the source of the FET 62A of the selection circuit 54, the cathode of the auxiliary light reception element 50B is connected to the source of the FET 62B, and the cathode of the auxiliary light reception element 50C is connected to the source of the FET 62C. The drains of the FETs 62 and the cathode of the light reception element 50M are connected to the inverting input terminal of the op amp 64 of the converter 52.

That is, the cathode of the light reception element 50M is directly connected to the inverting input terminal of the op amp 64, while the cathodes of the auxiliary light reception elements 50A to 50C are connected to the inverting input terminal of the op amp 64 via the corresponding FETs 62A to 62C.

Thus, in the present exemplary embodiment, the auxiliary light reception elements 50A to 50C are connected to the corresponding FETs 62 of the selection circuit 54. Therefore, by selectively applying a pre-specified voltage, which is a voltage for turning on the FETs 62 (below referred to as the on voltage) to the gates of the FETs 62, the auxiliary light reception elements 50A to 50C connected to the selected FETs 62 may be connected individually and in parallel to the light reception element 50M. Hence, currents corresponding to received light quantities which are outputted from the light reception element 50M and the auxiliary light reception elements 50A to 50C that are selectively electrically connected may be converted to voltages and outputted.

Meanwhile, the output terminal of the op amp 64 is connected to the ADC 72 of the calculation section 56. Hence, a voltage converted by the converter 52 is converted to a digital signal by the ADC 72, and the CPU 70 of the calculation section 56 calculates a light quantity received by the light reception portion 12 on the basis of this digital signal.

Output terminals of the register 84 of the calculation section 56 are individually connected to the FETs 62 of the selection circuit 54. Thus, the on voltage is selectively applied to the gates of the respective FETs 62 in accordance with the switching element control signals that are sent from the CPU 70 via the register 84.

Figure 4:
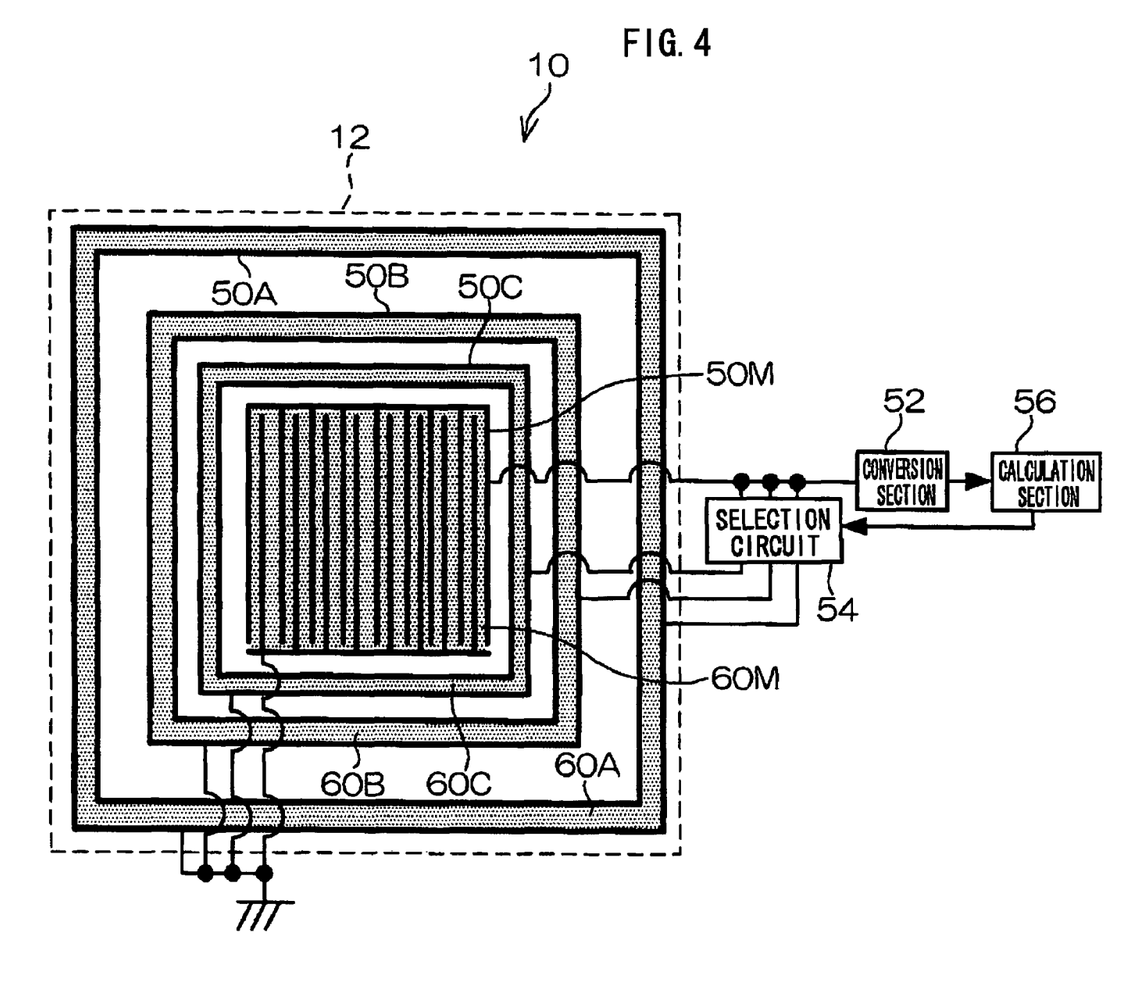
FIG. 4 is a plane view showing shapes of light reception surfaces of light reception elements relating to the exemplary embodiment.

FIG. 4 shows shapes of the light reception surfaces of the light reception element 50M and the light reception elements 50A to 50C relating to the present exemplary embodiment.

As shown in FIG. 4, surrounding a light reception surface 60M of the light reception element 50M, a light reception surface 60C of the auxiliary light reception element 50C is disposed in the same direction as the light reception surface 60M. A light reception surface 60B of the auxiliary light reception element 50B is disposed in the same direction as the light reception surface 60M, around the light reception surface 60C and, similarly, a light reception surface 60A of the auxiliary light reception element 50A is disposed in the same direction as the light reception surface 60M around the light reception surface 60B. Hereinafter, where it is necessary to distinguish between the respective light reception surfaces, the letter is appended after the reference numeral, and where it is not necessary to distinguish, the notation is given with the letter omitted.

The areas of the light reception surfaces 60 relating to the present exemplary embodiment are respectively different. Table 1 shows examples of area ratios of the light reception surfaces 60A to 60C of the auxiliary light reception elements 50A to 50C if the area of the light reception surface 60M is taken to be 1. In Table 1, the light reception element 50M and the auxiliary light reception elements 50A to 50C are shown, but only the suffix letters of the corresponding reference numerals are noted.

The area ratios listed in Table 1 are employed as area ratios of the light reception surfaces 60 of the light reception element 50M and auxiliary light reception elements 50A to 50C in the descriptions hereafter.

TABLE 1

| Light reception element | Area ratio of light reception surface |
| --- | --- |
| M | 1 |
| A | 0.8 |
| B | 0.4 |
| C | 0.1 |

Figure 5:
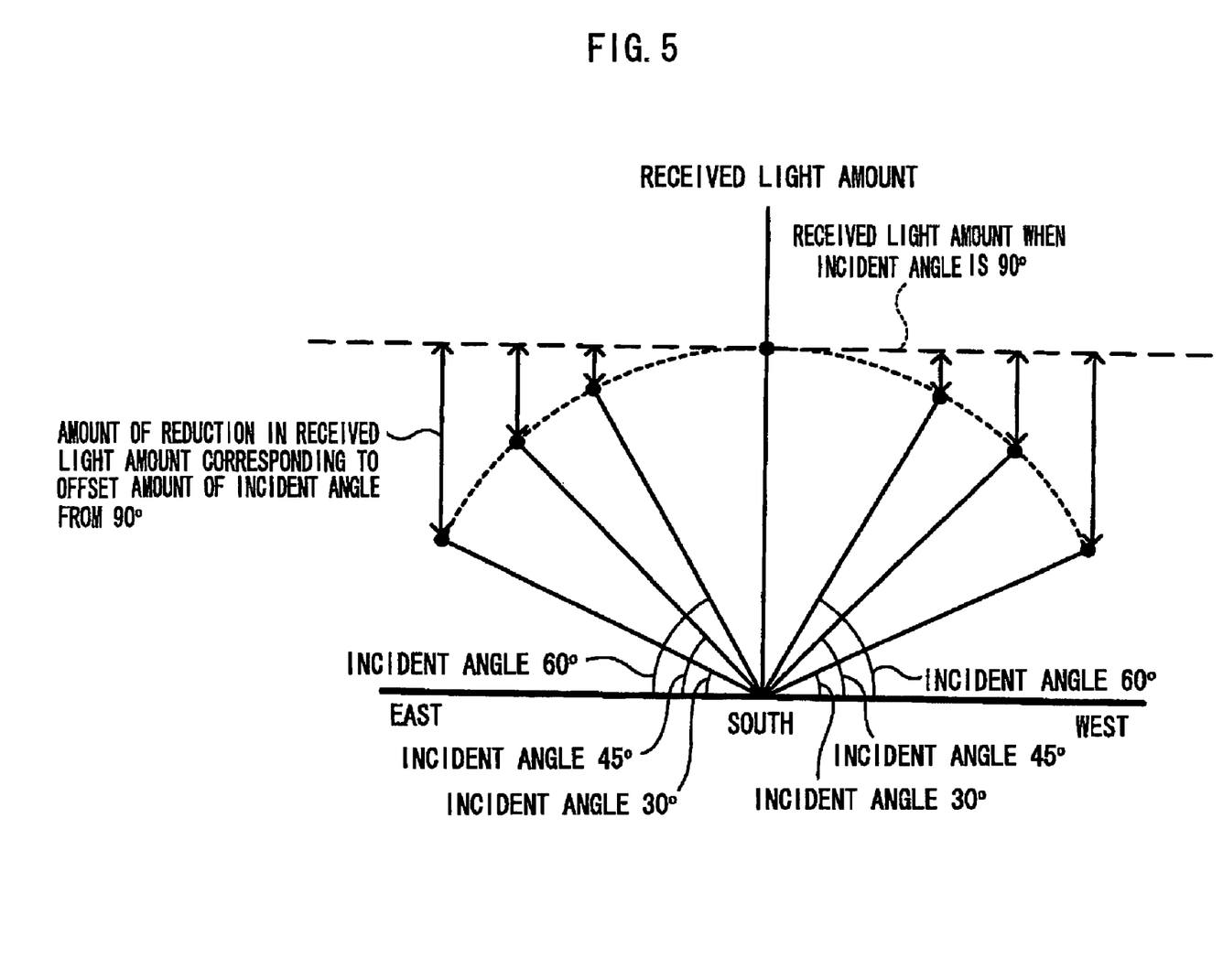
FIG. 5 is a schematic view showing an example of a relationship between incident angles of incident light on a light reception surface and currents outputted by a light reception element.

FIG. 5 shows variations in received light quantities of the light reception element 50M alone in a state in which the device body is fixed and the sun moves from east to west, with the light reception portion 12 having been oriented to a direction that is southward and toward a maximum height of the sun (hereinafter referred to as the maximum solar elevation).

As shown in FIG. 5, when the position of the sun is to the south (at the maximum solar elevation), the incident angle of incident light with respect to the light reception surface 60M is 90°, and a received light quantity according to the light reception element 50M is at a maximum. However, when the position of the sun is not to the south, the incident angle of the incident light with respect to the light reception surface 60M is offset from 90°, and the received light quantity according to the light reception element 50M is reduced in accordance with the amount of offset.

Accordingly, in the light quantity measuring device 10 relating to the present exemplary embodiment, the selection circuit 54 selectively electrically connects the cathodes of the auxiliary light reception elements 50A to 50C to the cathode of the light reception element 50M in accordance with offset amounts so as to compensate for reductions in received light quantities.

Table 2 shows examples of combinations of the cathodes of the auxiliary light reception elements 50A to 50C that are selectively electrically connected to the cathode of the light reception element 50M in accordance with the above-mentioned offset amounts, together with the switching element control signals that are sent from the CPU 70 to the selection circuit 54 via the register 84. In the present exemplary embodiment, when a "1" is sent as a switching element control signal, the on voltage is applied to the gate of the corresponding FET 62. In Table 2, the light reception element 50M and the auxiliary light reception elements 50A to 50C are shown, but only the suffix letters of the corresponding reference numerals are noted.

The area ratios of light reception surfaces that are shown in Table 2 are total values of the areas of the light reception surfaces 60 of the light reception element 50M and the auxiliary light reception elements 50A to 50C that have been turned on by the switching element control signals. The offset amounts corresponding to the total area ratios of the light reception surfaces 60 are values obtained from results of actual measurements of current values outputted from the light reception element 50M, in accordance with the incident angle of incident light with respect to the light reception surface 60M of the light reception element 50M being offset from 90°.

In the light quantity measuring device 10 relating to the present exemplary embodiment, information representing the combinations of the light reception element 50M with the auxiliary light reception elements 50A to 50C (below referred to as combination information) for the respective offset amounts shown by Table 2 is pre-stored in the ROM 74.

TABLE 2

| Combination of light reception elements | Switching element control signals | | | Total area ratio of light reception surfaces | Offset amount (°) |
|---|---|---|---|---|---|
| | FET 62A | FET 62B | FET 62C | | |
| M | 0 | 0 | 0 | 1 | 0 |
| M, A | 1 | 0 | 0 | 1.8 | 54 |
| M, B | 0 | 1 | 0 | 1.4 | 42 |
| M, A, B | 1 | 1 | 0 | 2.2 | 62 |
| M, C | 0 | 0 | 1 | 1.1 | 25 |
| M, A, C | 1 | 0 | 1 | 1.9 | 57 |
| M, B, C | 0 | 1 | 1 | 1.5 | 45 |
| M, A, B, C | 1 | 1 | 1 | 2.3 | 65 |

Figure 6:
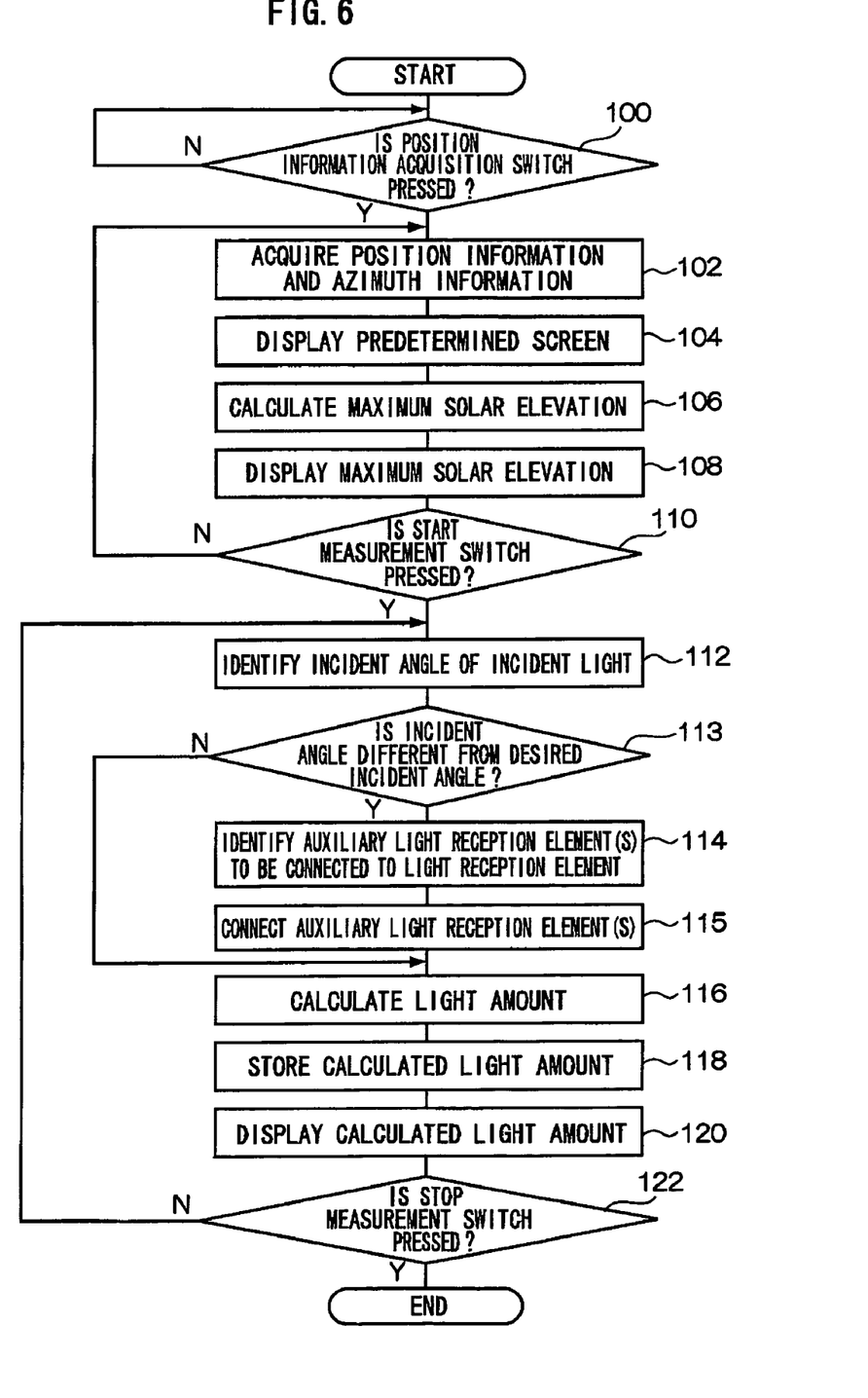
FIG. 6 is a flowchart showing a flow of processing of measuring light quantity relating to the exemplary embodiment.

Next, operations of the light quantity measuring device 10 relating to the present exemplary embodiment will be described with reference to FIG. 6. FIG. 6 is a flowchart showing a flow of processing of a light quantity measuring that is executed by the CPU 70 when the power switch 20 is operated by pressing and the light quantity measuring device 10 is put into a condition capable of operating. This processing is pre-stored in the ROM 74.

First, in step 100 of FIG. 6, the processing waits until the position information acquisition switch 22 is operated by pressing. Then, when the position information acquisition switch 22 is operated by pressing, in step 102, position information is acquired from the position identification section 78 and azimuth information is acquired from the azimuth identification section 82.

Next, in step 104, a pre-specified screen is displayed at the display section 16, showing numerical information indicating the azimuth represented by the acquired azimuth information.

Next, in step 106, the maximum solar elevation at the position of measurement on the date of measurement is calculated.

In the light quantity measuring device 10 relating to the present exemplary embodiment, the maximum solar elevation is θ (°), the latitude represented by the position information is φ (°), the solar declination is δ (°), and the hour angle of the sun is h (°). The latitude φ, the solar declination δ and the hour angle h are put into the following equation (1), and solar elevations θ for intervals of a predetermined time spacing are calculated for the date of measurement. Thus, the maximum solar elevation on the date of measurement is calculated.

$$\theta = \sin^{-1}\{\sin(\phi)\sin(\delta) + \cos(\phi)\cos(\delta)\cos(h)\} \quad (1)$$

For the solar declination δ, a number of days that have passed from January 1 is $d_n$, which is put into the following equation (2) to calculate a variable α. The variable α calculated from equation (2) is put into the following equation (3) to calculate the solar declination δ.

$$\alpha = 2\pi(d_n - 1)/365 \quad (2)$$

$$\delta = A - B\cos(\alpha) + C\sin(\alpha) - D\cos(2\alpha) + E\sin(2\alpha) - F\cos(3\alpha) + G\sin(3\alpha) \quad (3)$$

In the light quantity measuring device 10 relating to the present exemplary embodiment, the following values are employed: the constant A is 0.006918, the constant B is 0.399912, the constant C is 0.070257, the constant D is 0.006758, the constant E is 0.000907, the constant F is 0.002697 and the constant G is 0.001480.

For the hour angle h of the sun, an average hour difference is $E_q$ (°). The average hour difference $E_q$ is calculated by putting the variable α calculated from the above equation (2) into the following equation (4). A reference time for the region in which the measurement is being performed is $T_0$ (hours), and a difference (longitude difference) between a reference meridian of the region in which the measurement is being performed and the longitude represented by the position information is $\Delta_\psi$ (°). These and the average power difference $E_q$ calculated from equation (4) are put into the following equation (5), and thus the solar hour angle h is calculated.

$$E_q = H + I\cos(\alpha) - J\sin(\alpha) - K\cos(2\alpha) - L\sin(2\alpha) \quad (4)$$

$$h = (T_0 - 12)\pi/12 + \Delta_\psi + E_q \quad (5)$$

In the light quantity measuring device 10 relating to the present exemplary embodiment, the following values are employed: the constant H is 0.000075, the constant I is 0.001868, the constant J is 0.032077, the constant K is 0.014615 and the constant L is 0.040849.

Then, in step 108, the calculated maximum solar elevation is displayed by the display section 16.

In step 110, it is judged whether or not the start measurement switch 24 has been operated by pressing. If this judgment is positive, the processing advances to step 112, and if the judgment is negative, the processing returns to step 102.

Before the start measurement switch 24 is operated by pressing, an operator disposes the device body at the measurement position such that the azimuth displayed at the display section 16 shows South and adjusts the support member 30 such that the light reception surface 60 is oriented to the direction of the maximum solar elevation.

In step 112, an incident angle of incident light with respect to the light reception surface 60M of the light reception element 50M at the current time is identified.

In the light quantity measuring device 10 relating to the present exemplary embodiment, equation (1) is used to calculate the solar elevation at the current time of the date of measurement. Then, with the incident angle of incident light on the light reception surface 60M of the light reception element 50M being Θ(°), the maximum solar elevation being $\theta_{MAX}$ (°) and the solar elevation at the current time being $\theta_{NOW}$ (°), the maximum solar elevation $\theta_{MAX}$ and the current time solar elevation $\theta_{MAX}$ are put into the following equation (6), and the incident angle $\Theta$ is identified.

$$\Theta = 90 - (\theta_{MAX} - \theta_{NOW}) \quad (6)$$

Then, in step 113, it is judged whether the incident angle of incident light identified in step 112 is different from a desired incident angle (90° in the present exemplary embodiment).

For this judgment, the identified incident angle $\Theta$ is put into the following equation (7). Hence, an offset amount $\Phi$ (°) from the desired incident angle is calculated. If the value of the offset amount $\Phi$ is not 0 (zero), the judgment is positive. Specifically, the judgment is positive unless the value of the offset amount $\Phi$ is within a predetermined range containing 0.

$$\Phi = 90 - \Theta \quad (7)$$

If the judgment is positive in this step, the processing advances to step 114.

In step 114, it is identified which of the auxiliary light reception elements 50A to 50C is/are to be electrically connected with the light reception element 50M.

In this step, the combination information is read from the ROM 74 and, on the basis of the combination information that is read, it is specified which of the auxiliary light reception elements 50A to 50C are to be combined with the light reception element 50M in accordance with the offset amount $\Phi$ that has been calculated from equation (7) in the above step 113.

In the present exemplary embodiment, if the offset amount $\Phi$ calculated from equation (7) does not match any of the offset amounts indicated by the combination information, then the combination corresponding to the closest offset amount is employed as the specified combination of the auxiliary light reception elements 50A to 50C. If there are two offset amounts closest, then the combination corresponding to the smaller offset amount is employed, but this is not intended to be a limitation and the combination corresponding to the larger offset amount could be employed.

Next, in step 115, switching element control signals corresponding to the specified auxiliary light reception elements 50A to 50C are outputted to the selection circuit 54. Hence, the cathodes of the auxiliary light reception elements 50A to 50C are electrically connected with the cathode of the light reception element 50M by the selection circuit 54.

For example, if the offset amount $\Phi$ calculated from equation (7) is 62°, the auxiliary light reception elements 50A and 50B are identified as the auxiliary light reception elements to be combined with the light reception element 50M (see Table 2). Accordingly, a "1" is sent from the CPU 70 to the selection circuit 54 via the register 84, as a switching element control signal corresponding to the FET 62A, a "1" is sent as a switching element control signal corresponding to the FET 62B, and a "0" is sent as a switching element control signal corresponding to the FET 62C. The selection circuit 54 receives these switching element control signals and applies the on voltage to the gates of the FETs 62A and 62B. Thus, the cathodes of the auxiliary light reception elements 50A and 50B are electrically connected with the cathode of the light reception element 50M, and the processing advances to step 116.

Alternatively, if the judgment according to the judgment processing in step 113 is negative, the processing advances to step 116 without performing the processing in step 114 for identifying the auxiliary light reception elements 50A to 50C and the processing in step 115 for electrically connecting the cathodes of the identified auxiliary light reception elements 50A to 50C to the cathode of the light reception element 50M.

In step 116, a current representing a light reception quantity of the light reception element 50M and the selectively electrically connected auxiliary light reception elements 50A to 50C is converted to a voltage by the converter 52, this voltage is converted by the ADC 72, and a light quantity is calculated from the digital signal that is outputted therefrom.

Next, in step 118, information representing the calculated light quantity is stored in the RAM 76, in a time series.

In step 120, the calculated light quantity is displayed by the display section 16.

In step 122, it is judged whether the stop measurement switch 26 has been pressed. If this judgment is positive, the current program ends, but if this judgment is negative, the processing returns to step 112 and measurements are continued until the stop measurement switch 26 is pressed.

As has been described in detail hereabove, the present exemplary embodiment includes a first light reception element (here, the light reception element 50M) that receives predetermined incident light at a first light reception surface (here, the light reception surface 60M) and second light reception elements (here, the auxiliary light reception elements 50A to 50C) that receive the incident light at second light reception surfaces (here, the light reception surfaces 60A to 60C), which are oriented in the same direction as the first light reception surface. An incident angle of incident light with respect to the first light reception surface is identified by an identification circuit (here, the CPU 70), and when the incident angle differs from a desired incident angle, output portions of the second light reception elements are selectively electrically connected to an output portion of the first light reception element by a selection circuit (here, the selection circuit 54). Thus, light quantities may be measured with ease and high accuracy.

Moreover, in the present exemplary embodiment, because the plural second light reception elements include light reception surfaces with respectively different areas, light quantities may be measured with even higher accuracy.

Further, in the present exemplary embodiment, the selection circuit selectively electrically connects the output portions of the second light reception elements with the output portion of the first light reception element so as to compensate for a reduction in received light quantities due to the incident angle differing from the desired incident angle, with switching elements that, individually and in parallel, switch between connecting and not connecting the plural second light reception elements to the first light reception element. Therefore, electrical connections of the output portions of the second light reception elements with the output portion of the first light reception element may be implemented more easily.

Hereabove, the present invention has been described using the exemplary embodiment, but the technical scope of the present invention is not to be limited to the scope described in the exemplary embodiment. Numerous modifications and improvements may be applied to the above exemplary embodiment within a scope not departing from the spirit of the present invention, and modes to which modifications and/or improvements are applied are to be encompassed by the technical scope of the invention.

Furthermore, the above exemplary embodiment is not limiting to the inventions recited in the claims, and not all of the combination of characteristics described in the above exemplary embodiment are necessarily required for a resolution of the invention. Inventions with various stages of the above exemplary embodiment are to be included, and various inventions may be derived by combinations of the disclosed plurality of structural elements. Even if some structural element is removed from the totality of structural elements illustrated in the above exemplary embodiment, as long as an effect is obtained, a structure from which this some structural element has been removed may be derived to serve as the invention.

For example, in the above exemplary embodiment, a case has been described in which sunlight of a wavelength range in the ultraviolet region is the object of measurement, but the present invention is not limited to this. The object of measurement may be sunlight or the like of a wavelength range in the visible light region, and modes are possible in which sunlight of other wavelength regions is the object. In such cases too, the same effects as in the above exemplary embodiment may be realized.

In the above exemplary embodiment, a case has been described in which the areas of the light reception surfaces 60 of the light reception element 50M and the auxiliary light reception elements 50A to 50C are all different, but the present invention is not limited to this. Modes may be included in which the areas of the light reception surfaces 60 of the light reception element 50M and the auxiliary light reception elements 50A to 50C are the same. In such cases too, the same effects as in the above exemplary embodiment may be realized.

In the above exemplary embodiment, a case has been described in which the maximum solar elevation at the measurement position on the date of measurement is calculated with arithmetic equations, but the present invention is not limited to this. Modes are possible in which information representing solar elevations for respective latitudes, longitudes and dates and times is stored in the ROM 74 beforehand, in the form of a table or the like, and the maximum solar elevation at the measurement position on the date of measurement is calculated from this information. In such cases too, the same effects as in the above exemplary embodiment may be realized.

The structures of the light quantity measuring device 10 described in the above exemplary embodiment (see FIG. 1A, FIG. 1B, FIG. 3 and FIG. 4) are examples. Clearly, unnecessary portions may be removed and new portions may be added within a scope not departing from the spirit of the present invention.

The flow of processing of the light quantity measuring program described in the above exemplary embodiment (see FIG. 6) is also an example. Clearly, within a scope not departing from the spirit of the present invention, unnecessary steps may be removed, new steps may be added as necessary, and processing sequences may be rearranged.

The various equations described in the above exemplary embodiment (see equation (1) to equation (7)) and the coefficients used in these equations are also examples. Clearly, within a scope not departing from the spirit of the present invention, unnecessary parameters may be removed, new parameters may be added as necessary, and coefficient values may be altered.

The invention claimed is:

1. A light quantity measuring device comprising:
    a first light reception element that receives a predetermined incident light at a first light reception surface;
    a second light reception element that receives the incident light at a second light reception surface, which is oriented in the same direction as the first light reception surface;
    an identification circuit that identifies an incident angle of the incident light with respect to the first light reception surface; and
    a selection circuit that, when the incident light angle differs from a desired incident angle, selectively electrically connects an output portion of the second light reception element to an output portion of the first light reception element,
    wherein a plurality of the second light reception elements are provided, and the respective light reception surfaces thereof have different areas, and
    wherein the selection circuit selectively electrically connects the output portions of the second light reception elements with the output portion of the first light reception element, so as to compensate for a reduction in a received light quantity due to the incident light differing from the desired incident angle, via switching elements that, individually and in parallel, switch between connecting or not connecting at least one of the plurality of second light reception elements to the first light reception element.

* * * * *